United States Patent [19]

Kurpanek et al.

[11] 4,015,243
[45] Mar. 29, 1977

[54] MULTI-PROCESSING COMPUTER SYSTEM

[76] Inventors: Horst G. Kurpanek, 802 Allison Way, Sunnyvale, Calif. 94087; Gail P. Cone, 2276 Edsel Drive, Milpitas, Calif. 95035

[22] Filed: June 2, 1975

[21] Appl. No.: 582,778

[52] U.S. Cl. .......................................... 340/172.5
[51] Int. Cl.² ...................................... G06F 15/16
[58] Field of Search ............................... 340/172.5

[56] References Cited

UNITED STATES PATENTS

| | | | |
|---|---|---|---|
| 3,735,365 | 5/1973 | Nakamura et al. | 340/172.5 |
| 3,810,105 | 5/1974 | England | 340/172.5 |
| 3,810,114 | 5/1974 | Yamada et al. | 340/172.5 |
| 3,813,651 | 5/1974 | Yamada | 340/172.5 |
| 3,815,099 | 6/1974 | Cohen et al. | 340/172.5 |

Primary Examiner—Raulfe B. Zache
Attorney, Agent, or Firm—Gerald L. Moore

[57] ABSTRACT

The digital computer system herein described is a customized group of programmable multiprocessors, multiplex channels, control modules, and peripheral devices. Controlling the operation of a wide variety of data terminals, this system can be an independent digital computer system or a versatile extension of a larger computer system. Selected software, which forms a part of this system, determines the characteristics of the system for any given application. When attached to a host computer, this system can be a local and remote terminal controller, a local and remote external device controller, a front-end communications processor, or any combination of these things. Essentially, this system incorporates standard minicomputer hardware in a novel configuration that enables it to rival or enhance the performance of much larger computer systems.

10 Claims, 7 Drawing Figures

PROCESSOR STATES IN RELATION TO INTERRUPTS

| BYTE: | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| | NCA | | DAD | | CMD | CME | | | CPR 0 | CPR 1 | EDS | CHS | | | | |

NCA — Next Command Address specifies the memory address of the next CCW.

DAD — Data Address specifies the memory address of the next data byte for a data transfer command.

CMD — Command specifies the operation to be performed such as read or write.

CME — Command Extension is a modification of the command.

CPR0 — Channel Page Register 0, which is used by the channel when addressing memory, normally points to a page containing channel data.

CPR1 — Channel Page Register 1, which is used by the channel when addressing memory, normally points to a page containing channel commands.

EDS — External Device Status is the device status stored by the channel upon completion of an i/o operation.

CHS — Channel Status is the channel status stored upon completion of the i/o operation.

LOCATIONS 6,7,C,D,E,F are reserved.

FIGURE 6

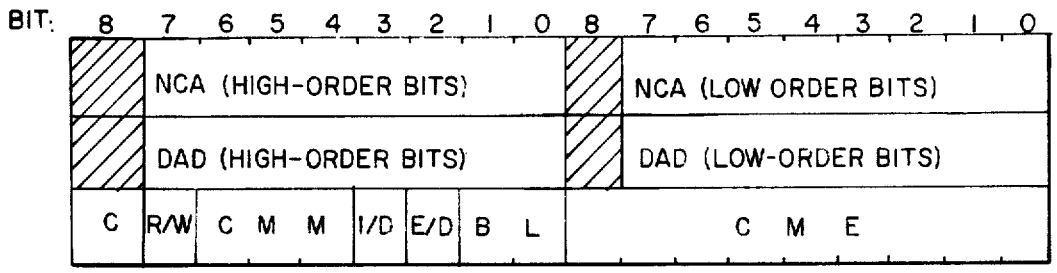

NCA Next Command Address-specifies the memory address of the next CCW.

DAD Data Address-specifies the starting memory address of the data block.

C Chaining-when 1-set, this bit causes the channel to fetch and execute the next CCW upon completion of the current CCW. Chaining, which remains in effect until C=0, suppresses the i/o completion interrupt.

R/W Read/Write-indicates a read command if 0-set and a write command if 1-set.

CMM Command-specifies the type of read or write operation. CMM codes depend on the device.

I/D Increment/Decrement-indicates whether the data address in the DSB is to be incremented (I/D=0) or decremented (I/D=1) as each data byte is transferred.

E/D Enable/Disable-Indicates whether the i/o completion interrupt is to be enabled (D/D=0) or disabled (E/D=1).

BL Block Length-indicates the byte boundary on which the data block ends.

CME Command Extension - specifies a modification of the command code.

FIGURE 7

MULTI-PROCESSING COMPUTER SYSTEM

BACKGROUND OF THE INVENTION

1. Field of Invention

The invention relates generally to data processing systems and specifically to the interrelation of functional units for the adaptation of processing resources to the requirements of input-output channels that service peripheral devices.

2. Description of the Prior Art

Reference is made to U.S. Pat. No. 3,815,099 entitled "Data Processing System" which is representative of the closest prior art.

In the typical data processor, the input and output data transfer between the system storage unit called the memory and an external data source or terminal called a peripheral device interferes with the operation of the unit called the processor. The interference takes many forms. In some cases, the processor executes an instruction to control the transfer and usually remains in the transfer path. The processor may also be able to transfer control to the peripheral device for a direct memory access, but the processor still has to perform some preliminary handoff operations and often cycle synchronizing and terminating operations as well. Or, on some common-bus arrangements, the processor has to process the interrupts, granting or withholding bus access. In any of these cases, the data transfer interrupts data processing. And, since the average peripheral device is slow compared even to the speed of a minicomputer, the interruption significantly reduces processing efficiency. Since the typical data processing system has only a single processor, the inefficiency of the processor seriously degrades system performance. Although some systems have more than one processor, the additional processors are usually dedicated to special functions or assigned to execute separate programs. Such processors cannot achieve the same level of performance as can similar processors in a multiprocessing and multitasking configuration.

It is therefore an object of the present invention to provide a data processing system with a multiprocessing and multitasking capability that enables several processors to cooperate in executing instructions from the same program in whatever order the processors are available.

It is another object of the invention to provide an efficient system configuration that interconnects processors, memory units, and a variety of input-output channels via a relatively high-speed time-division multiplex bus with a bus controller that reduces the interference between data transfer and data processing.

It is a further object of the invention to provide a system configuration in which the main memory serves as a common buffer between all processors and a variety of input-output channels.

It is an additional object of the invention to provide a system that can be optimally tailored to accommodate almost any combination of processing and input-output requirements merely by the selection of the appropriate number and position of suitable modular units.

Other objects and advantages of the invention will be obvious from the detailed description of a preferred embodiment given herein below.

SUMMARY OF THE INVENTION

The aforementioned objects are realized by the present invention which comprises a bidirectional bus having, in a preferred embodiment 75 conductors (over which all data transfer takes place), to which is connected a network of storage units, programmable digital processors, input-output data channels, and a utility channel interconnected by a singularly controlled bus for the purpose of managing the operation of many digital data terminal devices. Using a time-division multiplex scheme, the interconnecting bus enables a control program to assign processing and storage resources on a priority-ordered basis to meet a wide range of data processing and i/o channel servicing requirements. The data channels comprise a hierarchy of multiplexed subchannels that accommodate peripheral devices in a variety of configurations.

DESCRIPTION OF THE DRAWINGS

FIG. 6 shows the format of the device status block.

FIG. 7 shows the format of the channel command word.

DETAILED DESCRIPTION OF A PREFERRED EMBODIMENT

Figure 1:
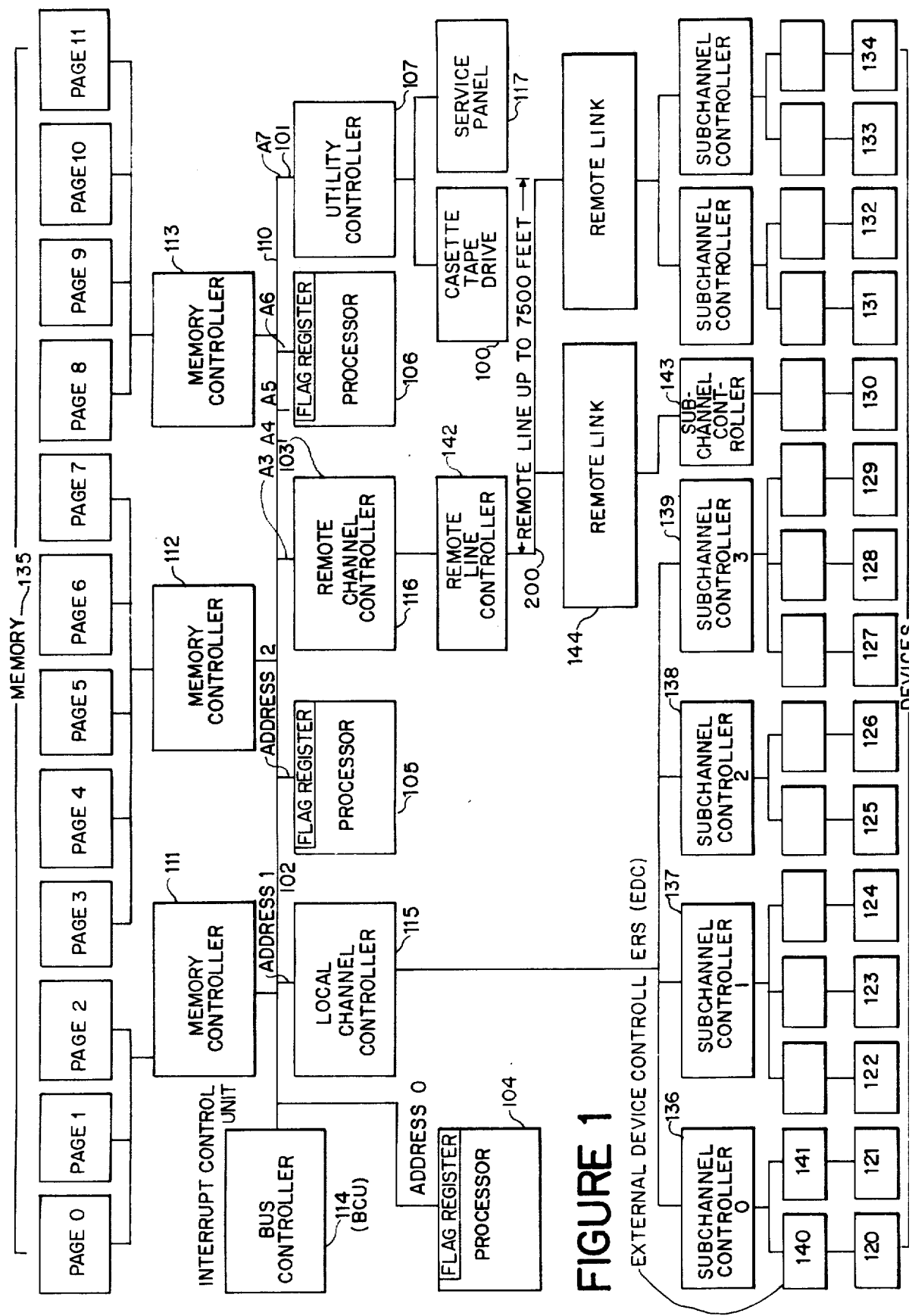
FIG. 1 shows an overall functional block arrangement of a representative system.

The processing system illustrated in FIG. 1 represents an example of the system arrangements made possible by this invention. The virtue of this system[1] lies not in the fact that it can accommodate more than 100 input-output devices while coordinating the operation of up to six processors in the execution of a variable number of applications programs, but that this system can achieve a high level of performance in multiprocessing and multitasking with a minimal number of functional assemblies of modest individual capability. The system memory, for example, has an average cycle time of one microsecond. Control software, which forms the supervisory operating system, and various applications programs direct the operation of the processing system. The programs can be loaded into memory through a cassette tape reader (eg. 100) on the utility channel 101 or through a peripheral device on any data channel (eg. 102 or 103). It is the functional organization of the system that gives it its extraordinary capability. That organization minimizes the interference between input-output data transfers and data processing, and the functions so organized are sufficiently modular that they allow maximum flexibility in matching resources with data transfer and processing requirements. This flexibility is an important factor in system performance because it allows the system to avoid the typical fault of being i/o bound or processor bound with unbalanced capability as expanding application changes requirements.

[1] Which is described by reference to a prototype which is structured to interconnect a given number of components — the actual quantities having no patentable significance.

The relevant characteristics of the system and its functional assemblies are described below. The major functions are implemented by separate printed wiring assemblies, which are plug-in cards. These cards are etched circuit boards incorporating large-scale integration with transistor logic. A processor (eg. 104, 105 or 106) requires three cards, and the utility channel controller 107 requires one card. Each of the other units represented by a block in FIG. 1 requires one card.

System Overview:

The system bus 110 consists of 75 conductors that form bidirectional paths for conveying signals from any of several sources to any of several destinations. The bus interconnects up to eight memory controllers (eg. 111–113), a bus and interrupt controller 114, and up to eight assigned users[2] (eg. 104,115,105,116,106,107). Each assigned user has a unique address identification, designated as address 0, 1, . . . , or 7. The assigned users are also ordered in a priority sequence that is independent of the address sequence. Address 0 always indicates a processor. Address 7 always indicates the controller for the cassette tape drive and the service panel 117 when either of those units are in the system. The remaining six addresses may be used for any mix of processors, local channel controllers, and remote channel controllers. Each local or remote channel controller controls a data channel that accommodates up to sixty-four devices (eg. 120–134).

[2] A user as defined herein consists of different classes, such as either a processor or channel controller. In the embodiment described herein there are eight bus users such as processors, channels or utility controllers. It will be understood however, that this is an arbitrary restriction without inventive significance.

On the other side of the bus are connected as many as eight memory controllers (eg. 111–113) which are not considered users. Each memory controller (eg. 111) accommodates up to eight random-access memory modules that form the system memory 135. The memory 135 serves as program storage and an input-output buffer for the bus users. The bus controller 114 and one or more memory controllers can take care of i/o transfers without interfering with processor operation.

The bus controller 114 is the heart of the system. It allocates time on the bus in two hundred nanosecond, and only two hundred nanosecond increments. The ICU is physically located within the BCU 114 monitors and distributes interrupts in accordance to priority as monitored by the BCU. The concept of a separate and independent ICU thus distinguishes the present system from those in which the interrupt is effected by a CPU (which necessitates a dedicated task CPU in order for the system to know where the interrupt resides).

The local channel controller (eg. 115) accommodates up to eight subchannel controllers (eg. 136–139), and each subchannel controller accommodates up to eight device controllers (eg. 140,141). The remote channel controller 116 accommodates up to four remote line controllers (eg. 142), which can exchange data with up to sixty-four external device controllers (eg. 140 and 141) via sixteen remote links (eg. 144), and subchannel controllers (e.g. 143). All data transferred within the system except on remote lines is parallel. The remote line controller 142 and the remote links convert data transfer format between serial and parallel. Data transfer is normally in byte-multiplex mode, but the first subchannel controller 136 of the local data channel 115 can also operate in priority mode.[3]

[3] In this case EDC's communicating on sub channel controller "0" (136) may request as many cycles as needed in order to satisfy their top data rate. All subchannel controllers may also operate in burst mode. When this mode is requested by an EDC the full transfer power of the channel is dedicated to the requesting EDC. During those instances the channel no longer acts as a multiplex channel.

The bus rate is 5-megahertz, which is fast enough to timeshare many devices. Memory transfer rate is approximately one megabyte per second. The local data channel rate is eight-hundred kilobytes per second, and the remote channel rate is 17.7 kilobytes per second. For typical data terminal requirements, the data channel is equivalent to direct memory access. Through one of the data channels, this system can join a host computer system locally via direct lines or remotely via voice-grade leased lines.

Function Description of Major Components:

External Device Controller:

Typical devices 120–134 are plotters, printers, card readers, badge readers, magnetic tape transports, disks, and keyboard data entry and crt display stations. Special device controllers may be data sets (MODEMS) for remote interface up to 50,000 baud or a selector, multiplex, or block multiplex interface for direct high-speed data transfer with the IBM system 360 or 370.

The external device controller (eg. 140) adapts a particular device to the subchannel. The main functions of the device controller are: 1) identify the device address; 2) transfer data between the device and the subchannel; 3) check parity; 4) check command validity; 5) recognize channel or device terminations and 6) maintain status indicators. Although the controller interprets most device codes by translating them into EBCDIC[4], keyboard interpretation is programmable. The keyboard output is translated by a decoding matrix in memory.

[4] An acronym for: Extended Binary Coded Decimal Interchange Code.

Subchannel Controller:

The subchannel controller polls in accordance to the local channel controller sequence, up to eight device controllers over lines that may extend up to one hundred feet and transfers data between a selected device controller and a channel controller on the local data channel or a remote link on a remote data channel.

Local Channel Controller (eg. 115):

The local channel controller continually scans the EDC's via the subchannels for activity. The subchannels have address designations 0 through 7, and the scanning sequence is 0, 1, 0, 2, 0, 3, 0, 4, 0, 5, 0, 6, 0, 7; subchannel 0 therefore is a priority subchannel for high speed devices.

Remote Channel Controller (eg. 116):

The remote channel controller (sometimes referred to as the Serializer-de-Serializer) controls the remote line controller (142) and scans them for activity.

Remote Line Controller (eg. 142):

The remote line controller operates independent from other remote line controllers. The main functions are: A) polling of up to sixteen remote links (drops) on a line that can run up to seven thousand five hundred feet, decoding of responses, and synchronizing transmission between the remote channel controller and the remote link; and B) conversion of the transmission format in either direction between the remote line controller and the remote link.

Remote Link (eg. 144):

The remote link converts transmission format both ways between the serial format of the remote line and the parallel format of the subchannel controller. Once the conversion is done, the interface is identical to that which exists on the local subchannel controller 136 thru 139. Hence the external device controllers (eg. 140 & 141) are the same as those which were designed for the local subchannel (e.g. 136–139). In the present embodiment each remote link can drive thirty-two external devices. There is thus a matrix such that, if one drop (remote link) is used, you could operate thirty-two devices from that link; if you utilize two remote links, each could drive thirty-two devices; if four remote links are used, sixteen devices could be operated by each remote link and so on. Physically, the remote line 200 is simply a single coax — which as previously mentioned, may be seventy five hundred feet long. Device 130 may therefore be located seventy five hundred feet from the local peripherals 120–129 without impairing the time required to communicate on bus 110.

Processor (e.g. 104, 105, 106):

Each processor (e.g. 104) executes programmed instructions supplied via the system bus 110 from the system memory. There are ninety-four different variable-length machine instructions. Control software, which is the supervisory operating system, and selected applications programs control the processing operations. The programs can be loaded into memory through the cassette tape device 100 on the utility channel 101 or through a peripheral device (e.g. 120–134) on any data channel. Each processor has twenty registers (not shown). There are seven eight-bit registers, which are used primarily for arithmetic and logic operations. For indirect memory addressing, there are two sixteen-bit base registers that work with 6 other 16-bit registers in memory. A 16-bit program counter, which may be modified by one or two page registers, points to the next instruction to be fetched from memory. Seven 14-bit registers form a pushdown stack for storing branch-return addresses in nesting subroutines up to seven levels. One nine-bit flag register holds control bits for program reference. Each processor is not a central processing unit; instead, it is one of a group of processors that form a multi-processing environment in which any processor can substitute for any other processor. Two or more processors may fetch instructions from the same task queue in memory, and this capability is called multitasking. To ensure that task and resource allocation are not duplicated, the control program requires a bus-lock condition. That condition occurs when only one processor has its bus-lock flag bit set (ULK high). That bit is reset when the allocation is completed, allowing another processor to establish a bus-lock condition. It will be understood however, that during bus-lock all other bus-transfers may take place.

Figure 2:
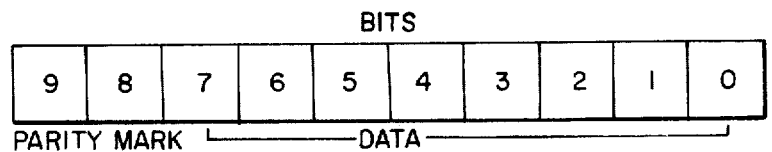
FIG. 2 shows the memory word and bus command format.

Memory:

In the prototype of the invention a modular, random-access, fixed address memory is utilized. In this system a memory byte comprises a ten-bit word, which includes eight data bits, one parity bit, and one mark bit. FIG. 2 illustrates the word format. The parity bit designates odd parity. The mark bit is a programming tag. One memory module, which is called a page (e.g. page 11), stores $2^{14}$ bytes. The memory is expandable to 16 pages, $2^{18}$ bytes, which is a limitation imposed by the choice of an 18-bit address word. The architectural limit of the system is 256 pages, $2^{22}$ bytes, with the appropriate modification of the address scheme. The memory pages are numbered sequentially. The lowest numbered pages, 0 and 1, can be directly accessed by machine instructions. Access to all other pages is via a programmable pointer in one of two page registers. Independent groups of up to eight pages form memory banks, which are independent of each other and interface with the system bus through their own memory controllers. Memory read time is eight hundred nanoseconds, four bus intervals. Memory write time is 1.2 microseconds, but writing takes only two hundred nanoseconds of bus time since all of the data to be written is transferred to the appropriate controller during the 200 nanoseconds time slice allocated by the bus controller 114. The write operations in different memory banks can, therefore, be overlapped up to the bus time slot of two hundred nanoseconds. Storage capacity can be increased by adding memory pages or by replacing them with faster memories.

MEMORY CONTROLLER

The memory controller (111) accommodates up to eight random-access memory modules (135) that form the memory system. The memory controller is of conventional design and can handle but is not limited to, 256,000 bytes. The prime task of the memory controller is (1) to decode the proper memory address, (2) bus synchronization, and (3) execution of the memory commands and memory refresh control. The memory 135 serves as program storage and an input-output buffer for the bus users. The bus controller 114 and one or more memory controllers take care of small i/o transfers without interfering with processor operation.

BUS CONTROLLER

The bus controller is the heart of the system. It allocates time on the bus to the users in 200 nanosecond increments on a priority basis. Priorities can be assigned from 0 to 7 where 0 represents the highest priority and 7 is the lowest priority. Remote channel controllers occupy the highest priorities 0 through 7, local channel controllers are assigned priorities $n$ plus 1 through $m$, processors have the lowest variable priority $m$ plus 1 through 6. Priority 7 is reserved for the utility controller. The ICU is physically located within the BCU and monitors and distributes interrupts in accordance to priority as monitored by the BCU. The concept of a separate and independent ICU thus distinguishes the present system from those in which the interrupt is effected by a CPU (which necessitates a dedicated task CPU in order for the system to know where the interrupt resides). The ICU can handle the following interrupt types: high/low priority, time interrupts, operator interrupts, external device interrupts, self-initiated CPU interrupts, CPU broadcast interrupts and machine failure interrupts such as power failure, memory parity failure, et cetera.

SYSTEM OPERATION:

An appreciation of the advantages of the present concept can be gleaned by considering a typical operation sequence. Assume for example, that one of the processors starts an i/o transfer by executing a start i/o instruction, which addresses a particular device via its channel and subchannel. Once the i/o transfer is started, the data channel takes over, and the processor is available to accept the next instruction. The data channel controllers execute channel commands, transferring command codes to designated devices, and each device returns an i/o complete when the operation is finished, (that is, a block of data has been transfered), and the bus controller directs an interrupt to an interruptible processor. If there is no interruptible processor at the time, the bus controller sends the interrupt vector to a memory controller, and the memory controller stores the vector in a first-in-first-out queue. The local data channel controller scans its subchannels, polling subchannel 0 every four hundred nanoseconds and polling the other subchannels every 3.2 microseconds until it receives a transfer request (which may be an interrupt request). Subchannel 0 is the priority subchannel. This subchannel has an eight to one interrupt margin over any other subchannel because of the polling scheme. It is possible to gain another eight to one preference by tieing only one device to subchannel 0 and eight devices to one or more of the other subchannels (e.g. 137–139); in essence, therefore, varying the allocation of transfer opportunity by a factor of 64. Connecting units to data channels with different priority assignments or with different bandwidths further expands the effect of allocation choices. This makes it possible to match the bus time allocation with the requirements of almost any mix of peripheral devices without overloading the system. (In the case of a peak overload, lost data called channel overrun are monitored and reported to the control program which thus in turn may activate a recovery routine).

Although processors and controllers generate and execute commands, their control is limited to the simple functions already described. The supervisory operating system, which is the control program, retains control of the system. If a device or even a processor fails, the control program drops that device subchannel or the processor off line, and the system operation continues with degraded performance.

Figure 3:
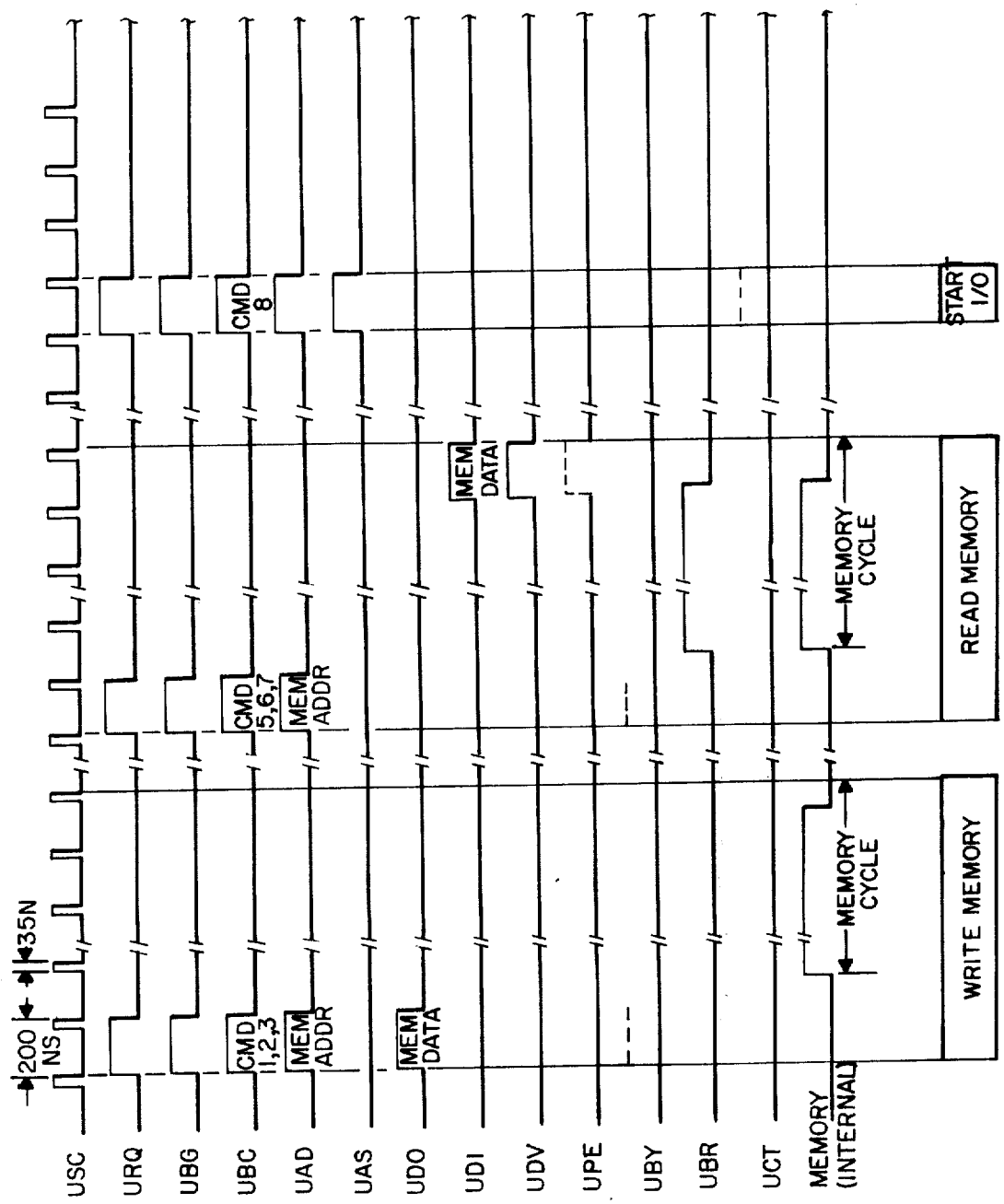
FIG. 3 shows the timing of various bus signals in a typical sequence.

The major control elements in this system are the program, control words, and status words stored in memory. In executing the program, bus users exchange commands and control signals via the bus 110. Table 1 defines the various lines that make up the bus, and Table 2 identifies the commands that are exchanged on the bus. FIG. 2 shows the basic word format, and FIG. 3 shows the relative timing of various bus signals in a typical sequence.

Table 1

| NUMBER OF LINES | SIGNAL | NAME | SOURCE* | INDICATION OR FUNCTION |
|---|---|---|---|---|
| 1 | USC | System Clock | Bus C. | Timing: a positive, 35-nanosecond pulse at 200-nanosecond intervals |
| 1 | UBR | Busy Reading | Memory C. | Reading memory. This signal prevents overlapping read operations. |
| 1 | UBY | Busy | Memory C. | Addressed while reading or writing. This signal suspends commands. |
| | | | Bus C. | Start i/o, halt, or interrupt command issued while UDV is active. |
| 1 | UDV | Data Available | Memory C. | Data from memory on UDI lines. |
| 1 | UPE | Parity Error | Bus C. | Memory data has incorrect parity. Processor that initiated read command sets parity error flag and requests priority 0 interrupt from bus controller. If a data channel initiated the command, a parity error bit is set in a corresponding status byte. |
| 1 | ULK | Bus Lock | Processor | Processor claims next task allocation. |
| 1 | UMC | Master Clear | Service panel | Clear all bus users except memory controlled |
| 1 | UCT | Condition Test | Channel C. | Channel not available. Processor issuing start i/o bus command monitors this line to determine whether data channel is available. |
| 1 | UIB | Interrupt Busy | Bus C. | Interrupt sequence is in progress. This inhibits other interrupt requests. |
| 8 | URQ | Bus Request | User | User requests bus access. |
| 8 | UBG | Bus Grant | Bus C. | Selected response to URQ. If more than one request is active, controller grants request according to priority of user. |
| 4 | UBC | Bus Command | User | Bus command code. |
| 8 | UAS | Address Select | Bus C. | Identifies source of bus command. |
| 18 | UAD | Address | User | Identifies command source and destination and interrupt control command modifier |
| 10 | UDI | Data In | Memory C. | Carries data to bus user. |
| | | | Bus C. | Carries interrupt vector to processor. |
| 10 | UDO | Data Out | User | Carries data to memory. |
| | | | Processor | Acknowledges processor state specified in interrupt control command. |

*"C." means controller; "User" means 1 of the 8 assigned bus users.

TABLE 2

| BUS COMMANDS | | | |
|---|---|---|---|
| BUS COMMAND | | | |
| Number | Description | From* | To* |
| 1 | Write data, parity | P | M |
| 2 | Write mark | P | M |
| 3 | Write data, mark, parity | P,B,C,U | M |
| 5 | Read data, parity | P | M |
| 6 | Read mark | P | M |
| 7 | Read data, mark, parity | P,B,C,U | M |
| 8 | Start i/o | P,U | C,U |
| 11 | Halt | U | P |
| 13 | Read interrupt vector | P | B |
| 14 | Interrupt request | P,C,U | B |
| 15 | Interrupt control | | |
| Modifer | | | |
| UAD = 0 | Post interrupt poll | P | B |
| UAD = 4 | Poll Wait | B | P |
| UAD = 5 | Poll Interrupt Enable | B | P |
| UAD = 8 | Set interrupt hook | B | P |

Figure 4:
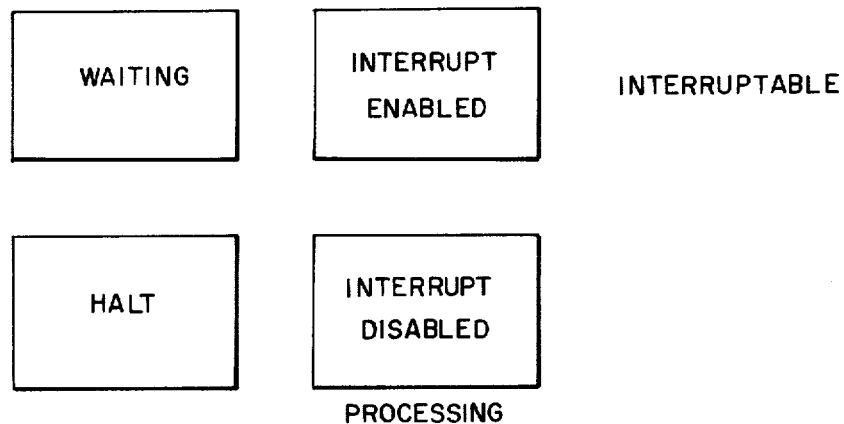
FIG. 4 shows the processor states in relation to interrupt conditions.
Figure 5:
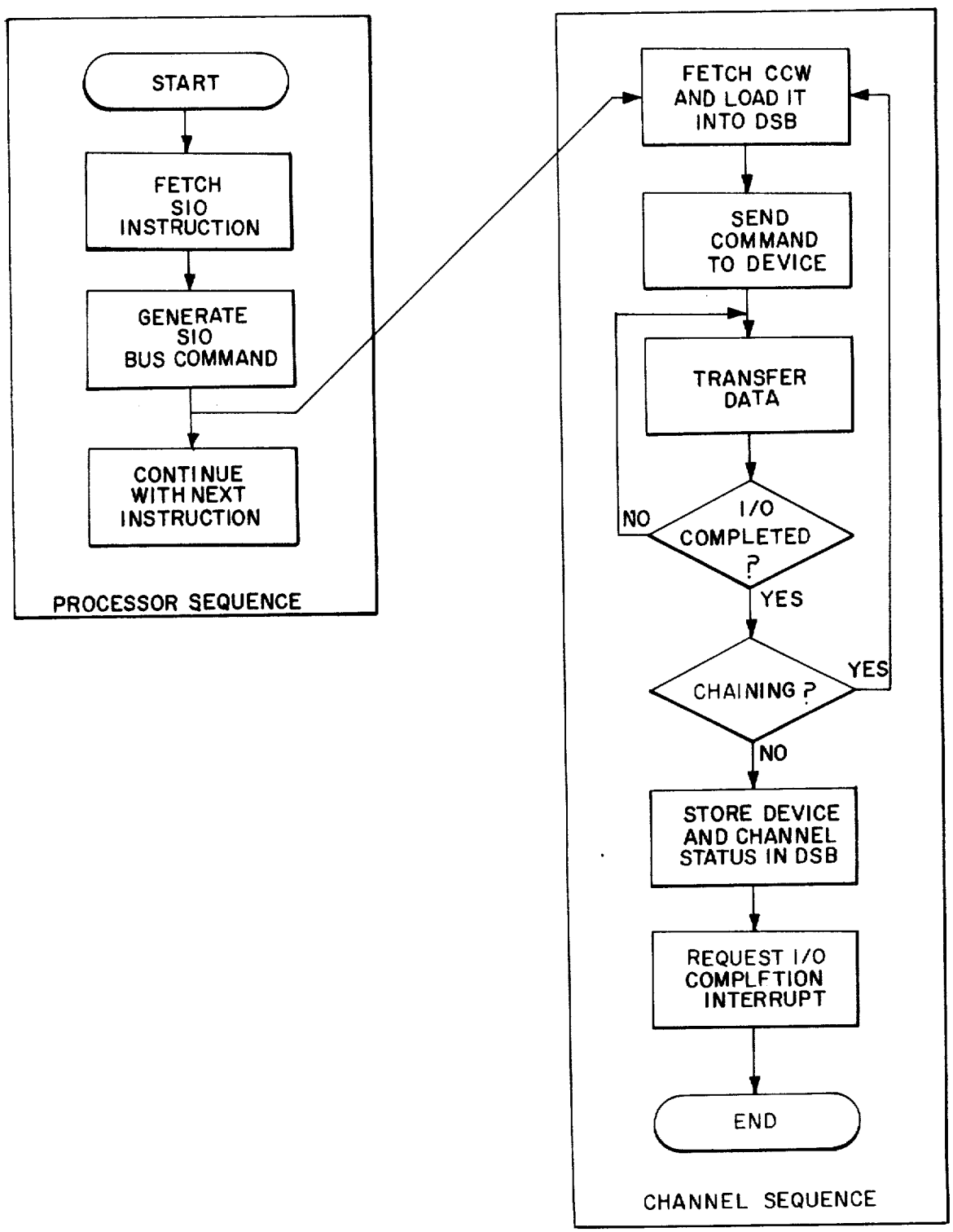
FIG. 5 shows the start i/o control sequence.

*P means processor
M means memory controller
B means bus controller
C means channel controller
U means utility controller The i/o control sequence shown in FIG. 5 starts when the processor fetches a SIO instruction. Following the command code in that instruction is the address of a device status block, DSB. The first byte in the DSB, as shown in FIG. 6, points to a channel command word, CCW. A channel controller fetches the CCW and loads it into the DSB for execution. The CCW, as shown in FIG. 7, specifies the type of command, the mode in which the command is to be executed, the starting address of the data block, the byte boundary on which that block ends, and the memory address of the next CCW. There are two categories of interrupts in this system, and there are several kinds of interrupts in each category. Assigned to each kind of interrupt is a unique pointer called an interrupt vector, which points to a location in memory where the appropriate processing routine for that interrupt begins. One of these interrupt categories requires immediate processing. The other category comprises interrupts that are queued[5] in memory to be processed by the first available processor. FIG. 4 shows the processor states that relate to interrupts. Interrupts in the first category in order of decreasing priority are power failure, parity error, instruction interrupt, first-category processor interrupt, and i/o complete interrupt. The interrupts that are relevant to this invention are of the second category.

[5] A queue is defined as locations in memory which contain the interrupt information.

Stored in fixed locations in memory are control blocks and status blocks. A control block of 256 bytes consists of interrupt vectors, queues, pointers, and control words common to all bus users. Each bus user has a five-hundred and twelve byte status block in memory. The interrupt vector block, IVB, contains interrupt vectors that are two bytes in length. An interrupt vector is the starting program address of an interrupt processing routine. An interrupt vector pointer, IVP, points to the appropriate interrupt vector within the IVB for a specific interrupt condition. The bus controller uses the IVP to fetch the interrupt vector. A post interrupt queue, PIQ, contains up to 64 2-byte entries. The bus controller makes an entry in the PIQ for each interrupt, and each entry indicates by its format the type of interrupt and the identification of the user requesting the interrupt. A pointer called the post pointer in PPI points to the next available entry location in the PIQ. The bus controller updates the PPI each time a new entry is made. Another pointer called the post pointer out, PPO, points to the entry in the PIQ that is currently being processed.

A processor that is executing a start i/o machine instruction, SIO, generates a start i/o bus command to initiate an i/o operation on a particular device. The device status block addressed by the SIO identifies the channel, subchannel, and device to be started. A data channel controller sends an interrupt request (bus command 14) to the bus controller when the data channel is finished with the i/o operation. Using bus command 7, the bus controller reads the interrupt vector from memory. The bus controller checks the enable bit in the vector and, if that bit is high, polls all processors (bus command 15) to find a processor that is in the wait state or otherwise interruptible. The mark bit in byte 2 of a program count is also an enable bit. If this bit is high, and bit 6 of the flag register is high enabling the processor to receive interrupts, the interrupt sequence is continued and bit 6 of the flag register is reset, disabling the processor to receive any further interrupts. If the enable bit is low the processor's ability to be interrupted remains unchanged. The bus controller makes an entry in the PIQ (bus command 3) when a processor responds to the poll. The bus controller then sends that processor bus command 15 with an interrupt hook (UAD=8) and starts a timer. The bus controller waits 10 milliseconds after setting the hook for a processor to issue a read interrupt vector command. If the processor fails to respond in that time, the interrupt remains in the queue. To read the interrupt vector, the processor sends bus command 13. The processor then branches to the program address indicated by the interrupt vector and begins processing.

In summary, the system allows a wide variety of peripheral devices to be connected so as to optimize the use of computational machinery. It differs from the prior art by virtue of the bus control unit, which obviates the need for dedicated processors and enables any task to reside in any processor at any time. All slow operations (the peripherals) are kept off of the bus by virtue of separate channels. The length of i/o bus and the speed of the multiplex channels, subchannels, and remote links does not effect the speed of the user bus.

Although the basic concept of the invention has been shown and described with reference to a particular system, it will be evident that said system is exemplary only, and the invention is not limited to a particular combination or number of elements. It will also be understood that numerous changes, modifications and substitutions may be made in the configuration without departing from the spirit of the invention.

We claim:

1. A digital communication system for transferring information represented by digital data signals comprising:
   a bus;
   a plurality of processors operatively connected to said bus;
   at least one channel controller attached to said bus;
   bus control means responsively connected to said bus for receiving interrupt signals from one or more controllers attached to said bus and for determining the state of each of said processors, and for interrupting a given processor when the processor is in a predetermined interruptable state.

2. The apparatus recited in claim 1 wherein said means for interrupting a processor comprises an Interrupt Control Unit and wherein said means for determining the state of each of said processors comprises:
   a flag register in each processor having an indicator bit representative of whether said processor is interruptable or non-interruptable.

3. A system for providing data communication on a data bus comprising:
   a plurality of bus users operatively connected to said bus, each bus user including means for signaling a bus request signal indicating the need to communicate through the data bus; and
   means receiving said bus user signals for allocating a fixed time interval to each user generating a signal in accordance with a predetermined priority assignment.

4. A system for transmitting data between one or more processors and one or more remotely located devices comprising:
   a unidirectional bus having a plurality of lines for parallel transmission of data;
   at least one processor operatively connected to said bus;
   at least one remote channel controller operatively connected to said bus;
   a remote line;
   serializing means operatively communicating with said remote channel controller and said remote line for converting the parallel data on said bus to serial data for transmission on said remote line;

remote link means operatively connected to said remote line for converting the serial data on said line to parallel data; and a subchannel controller operatively connected to said remote link means for operating at least one peripheral device.

5. An intelligent terminal system comprising first and second classes of users operatively communicating on a common parallel bus with each user including means for generating a bus request signal indicating the need to communicate through said bus;

means for allocating a fixed bus time increment to each class of users; and means receiving said bus request signals for allocating fixed time intervals to each user generating a bus request signal and in accordance with a predetermined priority assignment.

6. The apparatus recited in claim 5 wherein said first class of users includes:

a local channel controller;

a first subchannel controller operatively connected to said local channel controller; and at least one device controller operatively connected to said subchannel controller.

7. The apparatus recited in claim 6 wherein said local channel controller also includes:

a plurality of second subchannel controllers; and means for poling said first subchannel controller during every alternate bus time increment and for poling said second subchannel controllers one at a time alternately with the poling of said first subchannel controller.

8. The apparatus recited in claim 5 wherein said second class of users includes:

a first processor.

9. The apparatus recited in claim 5 wherein said second class of users includes:

a plurality of processors;

and wherein said means for poling each of said users from said second class in a predetermined address sequence comprises:

means for poling said processors to determine if any of said processors are in an interruptable state; and means for interrupting a processor which is in an interruptable state.

10. The apparatus recited in claim 5, wherein said second class of users includes:

a plurality of processors capable of executing programs;

at least one user includes means for generating an interrupt signal indicating the need for program execution, in combination with means receiving said interrupt signal and in response thereto for poling all users to locate a processor capable of receiving said interrupt signal and supplying said program execution.

* * * * *